United States Patent [19]
Brocchi

[11] 3,914,087
[45] Oct. 21, 1975

[54] DEVICE FOR ADJUSTING THE OPENING TRAVEL OF THE MOVABLE PLATE OF A MOULDING MACHINE FOR PLASTIC MATERIALS

[75] Inventor: Mario Brocchi, Lugano, Switzerland
[73] Assignee: F. Lli Sandretto S.a.s., Turin, Italy
[22] Filed: Aug. 26, 1974
[21] Appl. No.: 500,816

[52] U.S. Cl............ 425/451.9; 425/242 R; 425/247
[51] Int. Cl.² ............................................. B29F 1/06
[58] Field of Search............. 425/451.9, 242 R, 247

[56] References Cited
UNITED STATES PATENTS

| | | | |
|---|---|---|---|
| 2,790,204 | 4/1957 | Edwards et al. ................ | 425/247 X |
| 3,310,842 | 3/1967 | Fischboch...................... | 425/247 X |
| 3,726,625 | 4/1973 | Rees ................................. | 425/247 |
| 3,765,812 | 10/1973 | Sugiyama...................... | 425/242 R |

Primary Examiner—Robert L. Spicer, Jr.
Attorney, Agent, or Firm—Ladas, Parry, Von Gehr, Goldsmith & Deschamps

[57] ABSTRACT

A device for adjusting the opening travel of a mould holder unit of a machine for moulding plastic materials, comprising a movable plate which is arranged to support a portion of the mould and is actuated by at least one cylinder comprising a piston movable in a casing, said plate being movable, during the opening travel, from a first position, in which the mould is closed, to a second position in which the mould is open, is described. On a part rigidly connected to the piston is a member movable axially relative to the piston, fixable manually with respect to it and arranged to cooperate with a portion of said casing in order to stop the piston during said opening travel.

4 Claims, 3 Drawing Figures

DEVICE FOR ADJUSTING THE OPENING TRAVEL OF THE MOVABLE PLATE OF A MOULDING MACHINE FOR PLASTIC MATERIALS

Cross Reference to Related Application

Applicant claim priority from corresponding Swiss patent application Ser. No. 11597/73 filed on Aug. 10, 1973.

BACKGROUND OF THE INVENTION

The present invention relates to a device for adjusting the opening travel of the movable plate of a moulding machine for plastic materials, by means of which it is possible to stop said plate in a pre-established position during said opening travel.

As it is well-known, the moulding presses or moulding machines for plastic materials, in particular thermoplastic materials, are provided with a mould holder unit comprising a pair of plates between which is positioned the mould and one of which is arranged to move axially with respect to the other, departing from or approaching said other plate in order to allow, respectively, the opening or the closure of the mould.

Normally, said movable plate is actuated by a flowdynamical cylinder controlling a kinematic toggle mechanism, which is apt to cause said plate to move from a first position to a second position, in which positions said plate is located, respectively, at the minimal and the maximal distance from said other plate.

The movable plates reaches the first of said two positions when the kinematic toggle mechanism is in its extended position, i. e. in a position in which some of the members which constitute said mechanism arrange themselves in such a way as to originate substantially a chain of support bars which are apt to support the high injection pressures which discharge themselves onto the movable plate.

The travel of this plate, which is necessary for moving it from said first position to said second position, must be adjustable in accordance with the characteristics and dimensions of the mould mounted on the press, so that the above-mentioned second position must be variable to conform with the different conditions of operation of the machine.

In the prior art machines, the adjustment of the travel of said plate, and consequently the fixing of said second position, is obtained by acting on the hydraulic device which controls the flowdynamical cylinder actuating the kinematic toggle device; in fact, by discontinuing the feed of the working fluid to the flowdynamical cylinder during the opening travel of the movable plate it is possible to stop the latter in a pre-established position. However, the adjustment of the end of travel position of the movable plate, effected in the way described above, presents some disadvantages. First of all, said position cannot be fixed very precisely, nor is it possible to stop said plate always in the same position during each opening cycle of the machine. Furthermore, the stop of the movable plate thus obtained is not positive, that is to say that if external forces of a high value act on the plate, said plate does not maintain its position.

Also known are manually adjustable screw devices for adjusting the travel of such plates. Such devices comprise substantially a threaded stem which is screwed in a nut rigidly connected to the frame of the machine and whose one end passes through a wall of the casing of the flowdynamical cylinder to act as a stop for the piston of said cylinder; the position in which said piston and, consequently, the movable plate are stopped can be varied by turning the threaded stem.

The devices of this type present the disadvantage of having a very high axial dimension; in fact, said stem, which protrudes axially from the end of the flowdynamical cylinder, being provided with a smooth cylindrical portion which is apt to traverse the end wall of the casing of said cylinder, has a length which is at least twice as long as the length of the travel of the piston which it has to stop.

SUMMARY OF THE INVENTION

The object of this invention is to provide a device for adjusting the opening travel of a mould holder unit of a machine for moulding plastic materials, which will allow to eliminate the disadvantages described above.

The device according to the invention, comprises a movable plate which is arranged to support a portion of the mould, said plate being movable, during the opening travel, from a first position, in which said mould is closed, to a second position in which said mould is open, a cylinder comprising a piston movable in a casing and apt to actuate said movable plate, a part rigidly connected to said piston, a member movable axially relative to the piston, and mounted on said part, fixable manually with respect to it and arranged to cooperate with a portion of said casing in order to stop the piston during said opening travel.

BRIEF DESCRIPTION OF THE DRAWINGS

For a better understanding of the present invention, a particular embodiment of the invention will now be described by way of example with reference to the accompanying drawings, in which.

DETAILED DESCRIPTION OF THE INVENTION

Figure 2:
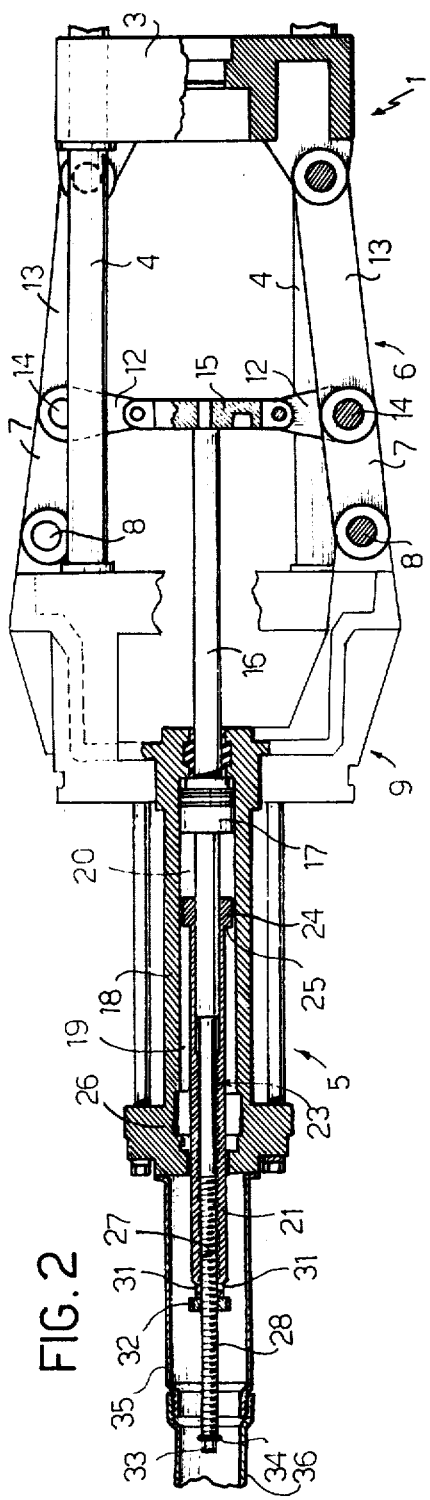
FIG. 2 is a partially sectional side elevation of a mould holder unit of a machine for injection moulding of thermoplastic materials, provided with the device according to the invention, the movable plate of said moulding press being shown in the first position described above.
Figure 3:
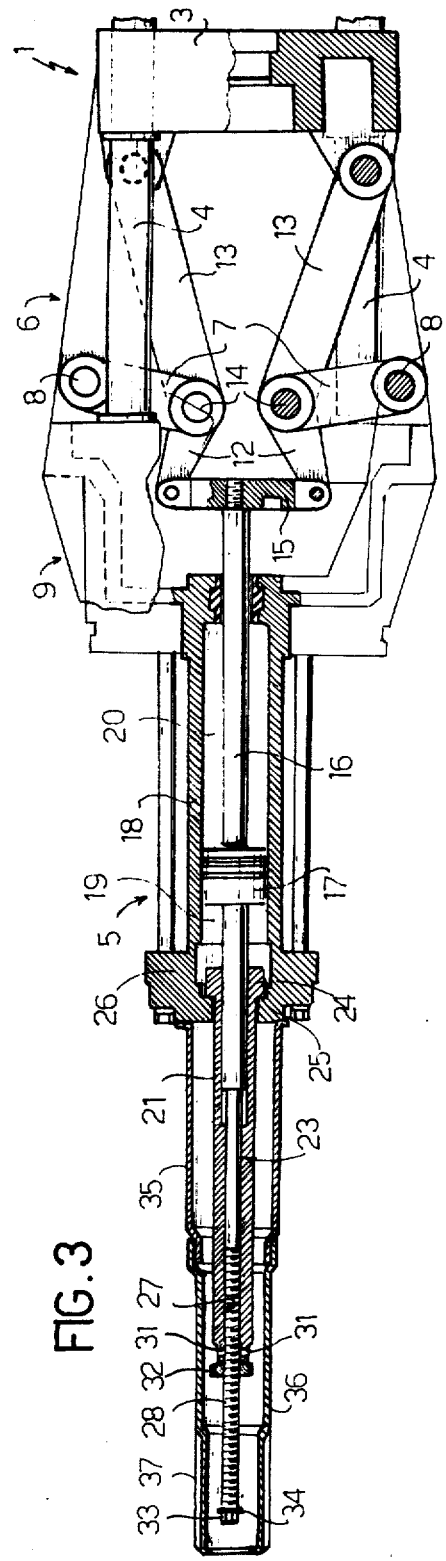
FIG. 3 is a side elevational view similar to that shown in FIG. 2, in which the movable plate of the moulding press is shown in the second position described above, in which said plate has been stopped by the device according to the invention.

Referring first to FIGS. 2 and 3, a machine for moulding thermoplastic materials is provided with a mould holder unit, indicated generally by the reference numeral 1, comprising a stationary plate (not shown) and a movable plate 3 slidable on cylindrical guides 4 which are supported by the frame 9 of the machine and between which, in a way known in itself, may be mounted a mould (not shown).

The movable plate 3 is actuated by a flowdynamical cylinder, indicated generally with the reference numeral 5, through a kinematic toggle mechanism indicated generally with the reference numeral 6; in the case of the embodiment shown, said kinematic mechanism consists substantially of two units, each of which comprises a crank 7 hinged by means of a pivot 8 on the frame 9 and a pair of connection rods 12 and 13, one end of which being hinged on a pivot 14 of the crank 7, while the other ends are hinged on a movable frame 15 and on the movable plate 3, respectively.

The movable frame 15 is fixed to one end of a stem 16 rigidly connected to a piston 17 of the flowdynamical cylinder 5. This cylinder comprises also a casing 18 which has slidably mounted therein the piston 17 and is fixed to the frame 9 of the machine. The piston 17, mounted on the end of the stem 16, for example by means of a pair of threaded rings 17a, defines, inside the casing 18, a pair of anular chambers 19 and 20, into each of which can be fed a pressurized fluid which is apt to cause the piston 17 to move in a prefixed direction, and from each of which said fluid can be discharged.

Figure 1:
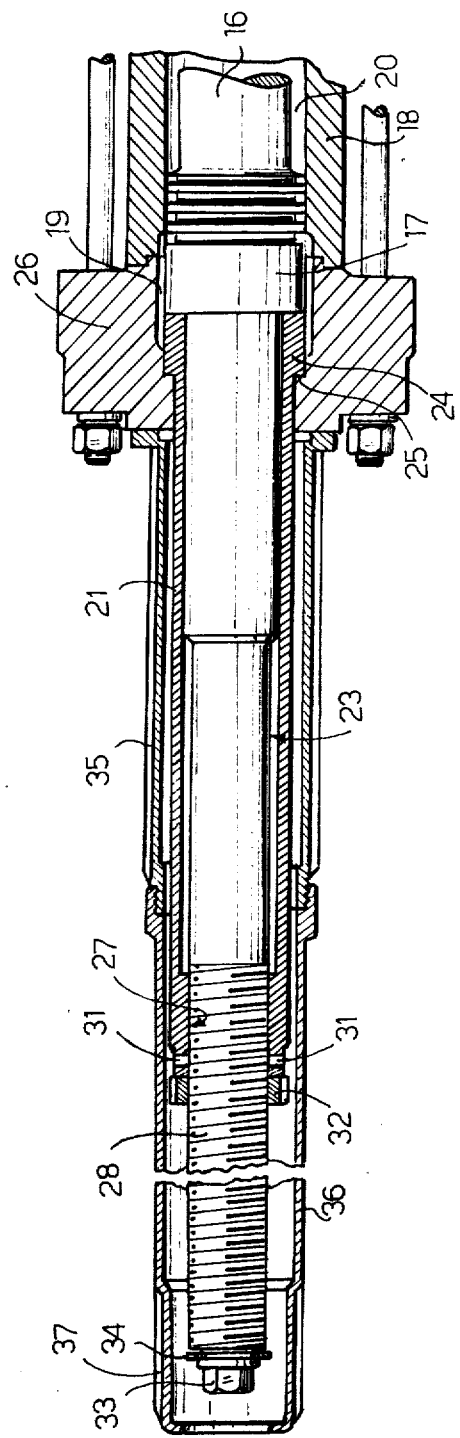
FIG. 1 is a longitudinal section of the device according to the invention.

Mounted on a machine of the specified type, known in itself, is a device according to the invention, shown in FIG. 1, which device comprises substantially a tubular element 21 (FIG. 1) movable axially on a cylindrical part 23 which is rigidly connected to the stem 16 and is disposed, with respect to the piston 17, at the side opposite the one at which the stem is situated.

The tubular element 21 is provided with an anular protuberance 24 having a shoulder 25 which is arranged to come into contact with a correspondent shoulder formed on an end wall 26 of the casing 18 of the flowdynamical cylinder 5. The tubular element 21 is also provided with a screw nut 27 which is arranged to engage with a thread 28 formed on the end of the cylindrical part 23. The tubular element 21 can be rotated, in order to move it axially with respect to the cylindrical part 23, by grasping it, for example, at the radial holes 31, and can be fixed axially with respect to said cylindrical part by means of a threaded ring 32. Conveniently, but not necessarily, the cylindrical part 23 is provided with an hexagonal end head 33 which is arranged to prevent said cylindrical part 23 from rotating when the hexagonal head is locked by means of a suitable key during the above-mentioned rotation of the tubular element 21 relative to said cylindrical parte.

Conveniently, between the head 33 and the thread 28 there is disposed a resilient ring 34 which is apt to prevent the threaded ring 32 from being completely unscrewed from the thread.

Disposed outside the tubular element 21 is a substantially cylindrical housing 35 which is fastened, in any suitable way, to the wall 26 of the flowdynamical cylinder 5; on a threaded end portion of said housing can be screwed a cover 36 provided with ribs 37 which are arranged to allow the unscrewing of said cover.

The operation of the device described in the foregoing takes place as follows.

Let us suppose that a pressurized fluid is fed into the interior of the chamber 19 (FIGS. 1, 3) of the flowdynamcal cylinder 5 and that other fluid is discharged from the chamber 20 of said cylinder, thereby causing the piston 17 to move towards the left as seen in the Figures. It follows that both the stem 16 and the movable frame 15 (FIG. 3) are displaced in the same direction and, supposing to start from the position in which the moulding press is shown in FIG. 3, the frame 15, by exerting a thrust on the connection rods 12, produces the rotation of the cranks 7 which control the rotation and translation of the connecting rods 13 to cause the kinematic toggle device 6 to assume its completely estended condition shown in FIG. 2. In such condition, the connecting rods 13 and the cranks 7 are substantially alligned and therefore constitute chains of support bars which are apt to support the high forces which are applied on the movable plate 3 when the moulding press is closed. Thus, the movable plate 3 assumes a position, hereinafter called first position, in which it is situated closer to the stationary plate, and the mould, disposed between said two plates, is closed; obviously, this position can be varied only by modifying the length of the various parts which constitute the toggles 6 (connecting rods 13 or cranks 7).

Suppose now that, starting from said first position of the movable plate 3, the latter has to be moved to a second position through a prefixed travel beginning from the precedent position.

To obtain this it is sufficient, after having removed the cover 36 (FIG. 1), to rotate the tubular element 21 with respect to the thread 28 of the cylindrical part 23; for carrying out said operation it is necessary to unscrew the ring 32 and, by means of a suitable key introduced into the holes 31, rotate the tubular element 21 while holding firmly, by means of another key, the head 33 of the cylindrical part 23. During the rotation of the tubular element 21 with respect to the thread 28 said tubular element is moved axially with respect to said thread, and consequently the piston 17 is displaced axially with respect to the annular protuberance 24 of said tubular element. At the end of the operation, the ring 32 is screwed again and the cover 36 is placed again.

Supposing to have set, by the above described operation, a prefixed travel for the movable plate 3, if pressurized fluid is now introduced into the chamner 20 of the flowdynamical cylinder 5 and fluid is discharged from the other chamber 19, the piston is caused to move to the left as seen in the Figures. At the end of the travel of the piston, the annular protuberance 24 of the tubular element 21 stops against the shoulder 25 of the wall 26. In this way, the stem 16 is stopped in a prefixed position to which corresponds said travel end position of the movable plate 3.

It is obvious, therefore, that by displacing, in the way described precedently, the annular protuberance 24 of the tubular element 21 with respect to the piston 17, pre-established travels of the movable plate 3 with respect to the stationary plate are obtained.

It follows from the foregoing that the travel of the movable plate 3 can be set by means of the device according to the invention in a very simple and quick way, inasmuch as it is necessary only to act manually on the tubular element 21. Furthermore, the position obtained is maintained with precision during each subsequent cycle of operation of the moulding press, without requiring further interventions of the operator or successive adjustments. Finally, the stop obtainable with the device according to the invention is of the so-called positive type, that is to say that even under the action of high axial forces exerted on the movable plate 3, the above mentioned travel end position is absolutely not subject to any variation; obviously, this depends upon the fact that when the annular protuberance 24 comes into contact with the shoulder 25, said protuberance is apt to support high axial loads.

Furthermore, in contrast with other known stop devices, the device according to the invention does not cause any increase of the axial dimension of the machine on which it is installed; in fact, the device according to the invention is accomodated entirely inside the casing of the flowdynamical cylinder.

What we claim is:

1. A device for adjusting the opening travel of a mould holder unit of machine for moulding plastic materials, comprising:
- a movable plate which is arranged to support a portion of the mould, said plate being movable, during the opening travel, from a first position, in which said mould is closed, to a second position in which said mould is open;
- a cylinder comprising a piston movable in a casing adapted to actuate said movable plate;
- a part rigidly connected to said piston;
- a member movable axially relative to the piston, and mounted on said part, fixable manually with respect to the piston and arranged to cooperate with a portion of said casing in order to stop the piston during said opening travel.

2. The device of claim 1, wherein said piston is rigidly connected to an actuating stem, and said part rigidly connected to said piston protudes axially from said piston, with respect to it at the side which is opposite that from which said stem protudes, and is provided with a threaded portion on which is screwed a screw nut rigidly connected to said member movable axially relative to the piston, the displacement of said member movable axially being carried out by means of a relative rotation of said member with respect to said part rigidly connected to the piston.

3. The device according of claim 1, wherein said casing of the cylinder is provided with an end wall, and said member movable axially is provided with an annular protuberance which is arranged to come into contact with a shoulder of said end wall in order to stop the piston during said opening travel.

4. The device of claim 1, wherein said member movable axially is provided with means which are apt to allow rotation of said member with respect to said threaded portion and prevent it from being spontaneously unscrewed relative to said threaded portion.

* * * * *